United States Patent
Charbonneau-Lefort et al.

(10) Patent No.: US 9,983,376 B2
(45) Date of Patent: May 29, 2018

(54) HIGH-DATA-RATE ELECTRICAL INTERCONNECT CABLES

(71) Applicant: Corning Optical Communications LLC, Hickory, NC (US)

(72) Inventors: Mathieu Charbonneau-Lefort, San Jose, CA (US); Rostislav Radiyevich Khrapko, Corning, NY (US); William Richard Trutna, Atherton, GA (US); Richard Clayton Walker, Palo Alto, CA (US)

(73) Assignee: Corning Optical Communications LLC, Hickory, NC (US)

( * ) Notice: Subject to any disclaimer, the term of this patent is extended or adjusted under 35 U.S.C. 154(b) by 0 days. days.

(21) Appl. No.: 15/131,252

(22) Filed: Apr. 18, 2016

(65) Prior Publication Data
US 2016/0314876 A1    Oct. 27, 2016

Related U.S. Application Data

(60) Provisional application No. 62/151,731, filed on Apr. 23, 2015.

(51) Int. Cl.
*H01B 11/22* (2006.01)
*G02B 6/44* (2006.01)
(Continued)

(52) U.S. Cl.
CPC ............ *G02B 6/4416* (2013.01); *H01B 3/02* (2013.01); *G02B 6/02395* (2013.01); *G02B 6/4432* (2013.01); *H01B 11/22* (2013.01)

(58) Field of Classification Search
CPC combination set(s) only.
See application file for complete search history.

(56) References Cited

U.S. PATENT DOCUMENTS

| 2,779,925 A | * | 1/1957 | Black | H01P 7/04 |
| | | | | 333/222 |
| 3,704,434 A | * | 11/1972 | Schlachter | H03H 1/00 |
| | | | | 333/170 |

(Continued)

FOREIGN PATENT DOCUMENTS

| CN | 202495281 U | 10/2012 |
| CN | 102492320 B | 1/2014 |

(Continued)

OTHER PUBLICATIONS

E. I. Green, F. A. Liebe, and H. E. Curtis, "The Proportioning of Shielded Circuits for Minimum High-Frequency Attenuation," The Bell System Technical Journal, V. 15, Apr. 1936, pp. 248-283.

*Primary Examiner* — William H Mayo, III
*Assistant Examiner* — Krystal Robinson
(74) *Attorney, Agent, or Firm* — Michael E. Carroll, Jr.

(57) ABSTRACT

High-data-rate interconnect cables are disclosed, wherein electrical data signals are transmitted in a conductor assembly made of a thin metal layer surrounding a cylindrical support member. The cylindrical support member can be a high-resistivity conductor or a dielectric, such as a glass optical waveguide that supports the transmission of optical signals. The cylindrical support member can also be a core conductor that supports the transmission of electrical power and low-frequency auxiliary signals. The high-data-rate interconnect cables are self-equalizing, so that a data link transmission system that employs the high-data-rate interconnect cable does not require active equalization.

42 Claims, 13 Drawing Sheets

(51) Int. Cl.
    *H01B 3/02*     (2006.01)
    *G02B 6/02*     (2006.01)

(56) References Cited

U.S. PATENT DOCUMENTS

| | | | | |
|---|---|---|---|---|
| 4,104,481 A | * | 8/1978 | Wilkenloh | C08J 9/0066 174/102 R |
| 4,319,803 A | * | 3/1982 | Burmeister | G02B 6/4402 385/128 |
| 4,418,984 A | * | 12/1983 | Wysocki | C03C 25/107 385/127 |
| 5,268,984 A | | 12/1993 | Hosoya et al. | |
| 5,574,260 A | * | 11/1996 | Broomall | H01B 1/02 174/102 R |
| 6,579,618 B1 | | 6/2003 | Ishikawa et al. | |
| 6,717,493 B2 | | 4/2004 | Chopra et al. | |
| 6,922,514 B2 | * | 7/2005 | Tirloni | G02B 6/02009 359/341.1 |
| 2004/0118591 A1 | | 6/2004 | Bufanda et al. | |
| 2013/0140055 A1 | * | 6/2013 | Adachi | H01B 7/0045 174/113 R |

FOREIGN PATENT DOCUMENTS

| | | |
|---|---|---|
| KR | 2010131312 A | 12/2010 |
| WO | 2012080207 A1 | 6/2012 |

\* cited by examiner

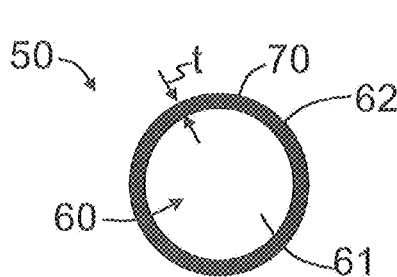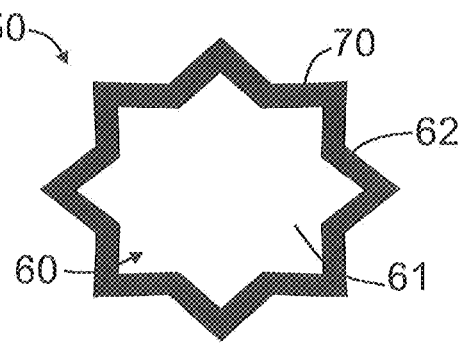
FIG. 4A	FIG. 4B
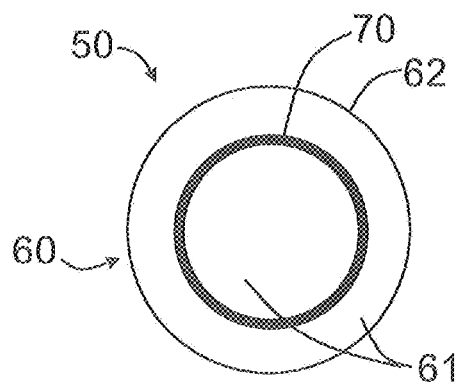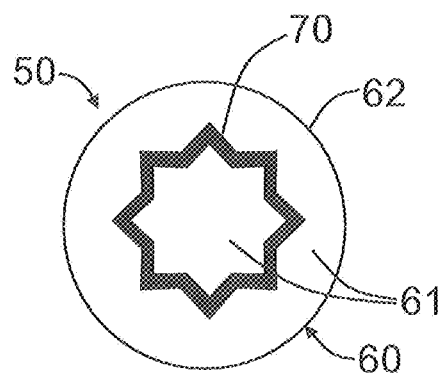
FIG. 4C	FIG. 4D
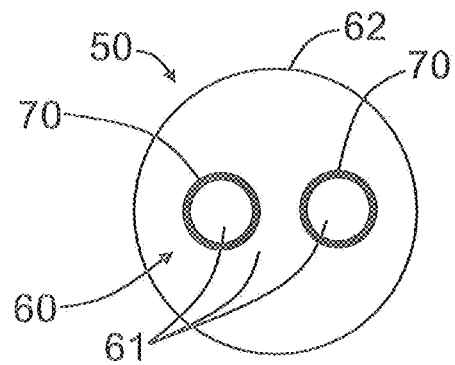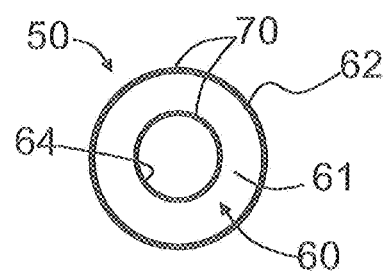
FIG. 4E	FIG. 4F

HIGH-DATA-RATE ELECTRICAL INTERCONNECT CABLES

CROSS-REFERENCE TO RELATED APPLICATIONS

This application claims the benefit of priority to U.S. Provisional Application No. 62/151,731, filed on Apr. 23, 2015, and is incorporated herein by reference.

FIELD

The present disclosure relates to electrical interconnects, and in particular to high-data-rate electrical interconnect cables.

BACKGROUND

Electrical cables have been used as electrical interconnects in a wide variety of data and power transmission systems. Traditional electrical interconnect cables utilize conducting wires separated by a low-loss dielectric material. Example types of copper-based electrical interconnects include coaxial cable and twin-axial ("twinax") cables. Direct-attached copper (DAC) cables are widely used in data centers for intra-rack connections.

Traditional wire-based cables suffer from frequency-dependent loss caused by a combination of skin effect, dielectric loss and roughness loss. Dielectric loss is due to the dielectric material (typically, a polymer) used to hold and separate the conductors in the cable. While low-loss dielectrics such as PTFE (Teflon) or even foams are used to mitigate the dielectric loss, they cannot completely eliminate this source of loss.

The skin effect is a fundamental phenomenon that affects all conductors and cannot be avoided. At high frequencies, the current that carries the electrical signals travels in a thin layer called the "skin depth," measured from the surface of a conductor. The higher the frequency, the thinner the skin depth, with the skin depth being inversely proportional to the square root of signal frequency. As a result, the resistance of a wire—and consequently, the loss—increases with frequency. It would therefore be desirable to have an electrical interconnect cable that could reduce at least one of these loss mechanisms in order to have improved (higher performance) electrical connections, especially in view of the increasing need for high-frequency (i.e., high data rate) transmission.

Another limitation of conventional electrical interconnect cables is the transmission of both high-data-rate data signals and power signals over the same cable because the losses are too large. Consequently, separate cables are used, one for the data signals and another for the power signal. It would therefore be desirable to have an electrical cable that overcomes the loss problems and that allows for transmitting both data and power signals over the same electrical interconnect cable.

SUMMARY

An aspect of the disclosure is conductor assembly for an electrical cable for transmitting electrical signals having a data rate. The conductor assembly includes: a cylindrical support member made of at least one of: a dielectric material, a metal having a resistivity R greater than $10^{-5}$ ohm-meters and a material having a relative magnetic permeability $\mu_T > 100$, the cylindrical support member having a body and an outer surface; and at least one metal layer supported by the cylindrical support member and having a thickness t and that supports the transmission of the electrical signals, wherein the thickness t is less than a skin depth as defined by half of the data rate of the electrical signals.

Another aspect of the disclosure is a conductor assembly for simultaneously transmitting electrical data signals and direct-current power. The conductor assembly includes: a cylindrical core conductor having an outer surface; a shield layer disposed on the outer surface of the cylindrical core, the shield layer having a relative magnetic permeability $\mu_T > 100$, a thickness w and an outer surface, wherein the shield layer has a skin depth $\delta s$ defined by a frequency of the electrical data signals, and wherein the thickness w is in the range $\delta s \leq w \leq 10 \cdot \delta s$; a metal layer of thickness t disposed on the outer surface of the shield layer, wherein the thickness t is in the range from $0.1\ \mu m \leq t \leq 10\ \mu m$; and wherein the core conductor supports the transmission of the direct-current power and wherein the metal layer supports the transmission of the electrical data signals.

Another aspect of the disclosure is a method of transmitting DC power and electrical data signals in a single electrical interconnect cable. The method includes: providing the single electrical interconnect cable with at least one conductor assembly having a cylindrical core conductor immediately surrounded with a shield layer having a relative magnetic permeability $\mu_T > 100$, a thickness w and an outer surface, which in turn is immediately surrounded by metal layer disposed on the outer surface of the shield layer and having a thickness t in the range from $0.1\ \mu m \leq t \leq 10\ \mu m$, wherein the shield layer has a skin depth $\delta s$ defined by a frequency of the electrical data signals and wherein the thickness w is in the range $\delta s \leq w \leq 10 \cdot \delta s$; transmitting the data signals in the metal layer; and transmitting the DC power in the core conductor.

Another aspect of the disclosure is a conductor assembly for transmitting electrical and optical data signals. The conductor assembly includes: an optical fiber that includes a glass core and a glass cladding immediately surrounding the core, wherein the glass cladding has an outer surface and wherein the glass core and glass cladding define an optical waveguide; at least one metal layer disposed on the outer surface of the glass cladding, the at least one metal layer having an outer surface and supporting the transmission of electrical data signals; and a dielectric layer disposed on the outer surface of the at least one metal layer, the dielectric layer having a loss tangent of between 0.0001 and 0.001 in a gigahertz frequency range.

Another aspect of the disclosure is a method of transmitting electrical data signals and optical data signals. The method includes: transmitting the electrical data signals in a metal layer that immediately surrounds a glass cladding that in turn immediately surrounds a glass core, wherein the glass cladding and glass core define an optical waveguide, and wherein a dielectric layer immediately surrounds the metal layer; and transmitting optical data signals in the optical waveguide.

Another aspect of the disclosure is a conductor assembly for transmitting electrical data signals and optical data signals. The conductor assembly includes: a glass core and a glass cladding immediately surrounding the core, wherein the glass core and cladding define an optical fiber waveguide that supports the transmission of the optical data signals; a metal layer disposed on an outer surface of the glass cladding, the metal layer supporting the transmission of the electrical data signals, wherein the electrical data signals have a frequency of between 25 GHz and 40 GHz; and a dielectric layer disposed on the outer surface of the metal layer, the dielectric layer having a loss tangent of between 0.0001 and 0.001 in a gigahertz frequency range.

Another aspect of the disclosure is an electrical interconnect cable that includes one or more of the conductor assemblies disclosed herein.

Another aspect of the disclosure is a data link system that includes one or more of the electrical interconnect cables disclosed herein; a transmitter that generates electrical data signals and operably connected to a first end of the electrical interconnect cable; a receiver operably connected to a second end of the electrical interconnect cable and configured to received the electrical data signals transmitted from the transmitter to the receiver over the electrical interconnect cable; and wherein the data link system does not include active equalization.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIGS. 1A and 1B are cross-sectional views of conventional electrical cables, wherein FIG. 1A shows a coaxial configuration and FIG. 1B shows a twin-axial configuration

FIGS. 4A through 4F are cross-sectional views of different conductor assemblies as disclosed herein;

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

The term "cylinder" as used herein is defined as an area projected along an axis so that each cross-section has the same cross-sectional shape, and includes tubes as well as solid areas. A circular cross-section shape is just one example of a cylindrical cross-section shape.

Electrical Cable Loss Mechanisms

Figure 1A:
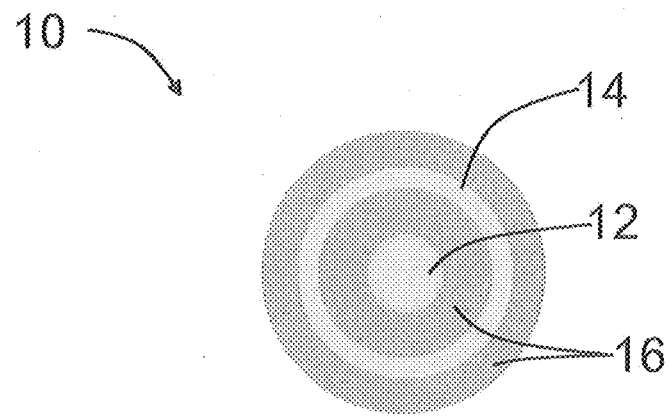
Figure 1B:
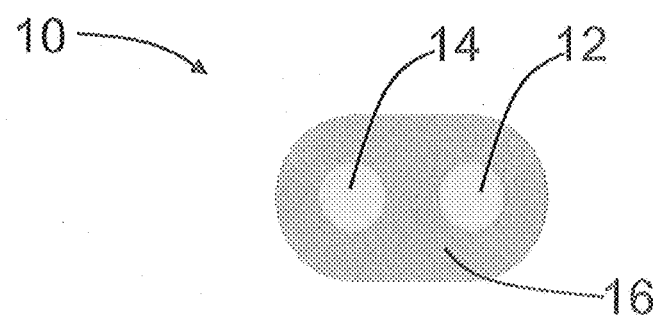

FIGS. 1A and 1B are cross-sectional views of a conventional electrical cable 10, wherein FIG. 1A shows a coaxial ("coax") configuration and FIG. 1B shows a twin-axial ("twinax") configuration. The coaxial cable 10 includes two conductors 12 and 14 separated by a dielectric material 16. In the coaxial cable 10, one of the conductors 12 is a central wire while the other conductor 14 is an annular wire concentrically arranged about the central wire. In the twinax cable 10, the two conductors 12 and 14 are spaced apart wires. The conventional electrical cable 10 can be used to transmit high-speed data.

As noted above, convention electrical cables 10 traditionally used to transmit data suffer from frequency-dependent loss caused by a combination of skin effect, dielectric loss and roughness loss. Dielectric loss is due to the dielectric material (typically, a polymer) used to hold and separate the conductors in the cable. Low-loss dielectrics such as PTFE (Teflon) or even foams are used to mitigate the impact of dielectric loss in high-speed applications.

The skin effect is a fundamental phenomenon that affects all conductors and cannot be avoided. In mathematical terms, at low frequencies, the current travels over the entire cross-section of a conductor. The resistance R of a wire is given by $R=\rho \cdot L/A$, where $\rho$ is the resistivity, L is the length of the wire, and A is its cross-section area. For a wire of circular cross-section, $A=\pi a^2$ where a is the radius of the wire.

At high frequencies, the current that carries the electrical signals travels in a thin layer underneath the surface. The thickness of this layer decreases when frequency increases. This phenomenon is called the skin effect, and the thickness of the current layer is called the skin depth $\delta$. Inside the conductor, the magnetic and electric fields both decay exponentially away from the surface, over a distance commensurate with the skin depth $\delta$.

The skin depth $\delta$ depends on the frequency f of the electrical signals as well as on the properties of the conductor. The skin depth $\delta=[\rho/(\pi \mu f)]^{1/2}$, where $\rho$ is the resistivity, $\mu$ is the magnetic permeability, and f is the frequency. The skin depth $\delta$, and consequently the loss, scale as the square root of the frequency f. The equation for the skin depth $\delta$ indicates that materials with large magnetic permeability $\mu$ have a small skin depth $\delta$.

The skin effect is responsible for frequency-dependent loss. A current traveling in a conductor sees a smaller cross-section area for higher frequencies than for lower frequencies. For instance, when the skin depth $\delta$ is much smaller than the diameter a of the wire, the effective area is given by $A=2\pi a\delta<<\pi a^2$. The resistance R is then given by $R=\rho \cdot L/(2\pi a\delta)$ and becomes large when $\delta$ is small. Surface roughness loss is a consequence of the skin effect. When the current travels in a thin layer at the surface of the conductor, the roughness of conductor surface increases the resistance.

Frequency-dependent losses limit the transmission bandwidth of electrical cables. When high frequencies are attenuated more than the low frequencies, it can become impossible to recover the transmitted electrical signal. This corresponds to "eye closure" on an eye diagram, at which point the receiver cannot distinguish logical zeroes from logical ones.

Figure 2A:
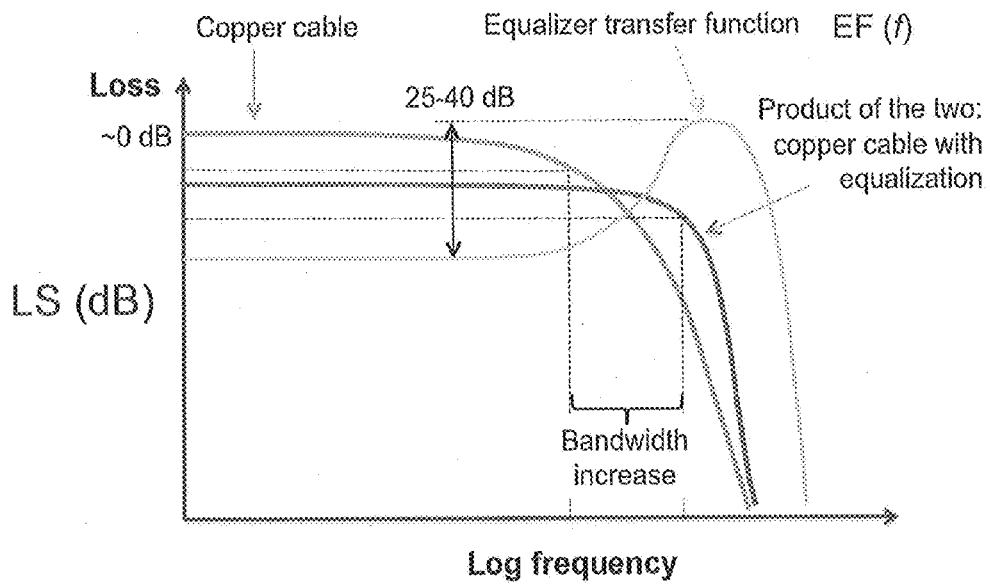
FIGS. 2A and 2B are a plots of the signal loss LS (dB) versus log (f) where f is the frequency, with FIG. 2A illustrating the transmission spectra for a conventional copper cable, an equalizer function EF(f) used to improve the bandwidth performance, and the improved copper cable performance using the equalizer function, and FIG. 2B additionally illustrating transmission spectra for a thin conductor having a rough surface (curve RS) and a thin conductor having a smooth surface (curve SS)

The traditional approach to overcoming frequency-dependent loss is to use active equalization to amplify high frequencies, or equivalently, attenuate low frequencies, to obtain a substantially flat transmission over a larger bandwidth. In practice, equalization is typically limited by crosstalk to between 25 and 40 dB. FIG. 2A is a plot of the transmission loss LS (dB) as a function of log (f), and shows the transmission spectra for a conventional copper cable, for an equalizer transfer function EQ(f), and for the transmission that has increased bandwidth by application of the equalization transfer function EQ(f).

Figure 3A:
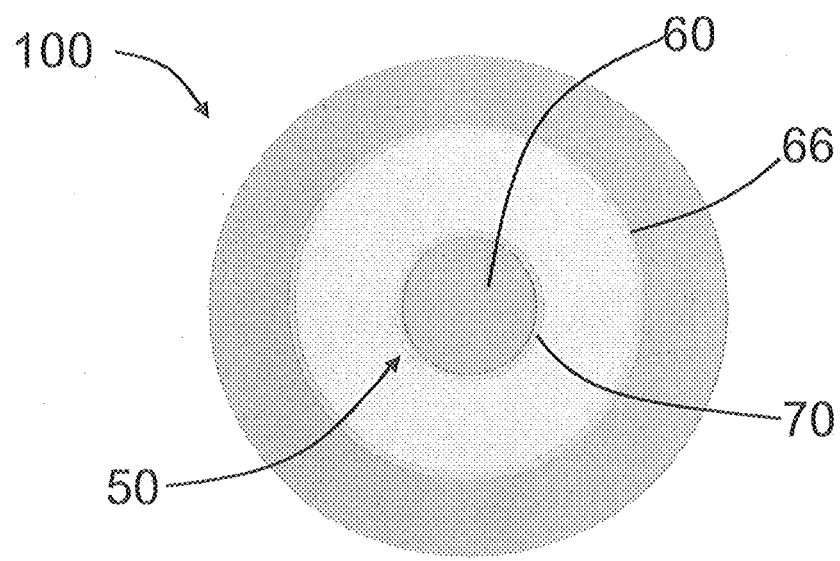
FIGS. 3A and 3B are cross-sectional views of two different example electrical interconnect cables that employ an example of the conductor assembly disclosed herein.
Figure 3B:
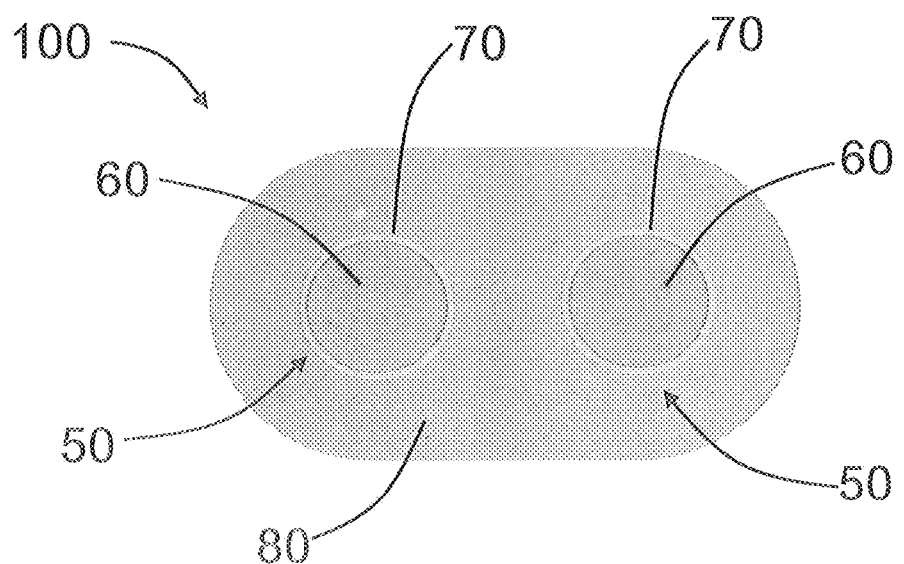

Another approach to obtaining a flat transmission spectrum is to employ tubular conductors having very thin walls. FIGS. 3A and 3B are cross-sectional view of example cables 100 in the form of a coax cable (FIG. 3A) and a twinax cable (FIG. 3B). The coaxial cable 100 of FIG. 3A has conductor assembly 50 that includes a support member 60 in the form of a dielectric cylinder with a metal layer 70 formed thereon so that the metal layer has a thin tubular shape. The twinax cable 100 of FIG. 3B includes two spaced apart conductor assemblies 50 embedded in a dielectric material 80. The coax cable 100 of FIG. 3A includes an outer conductor 66.

Figure 2B:
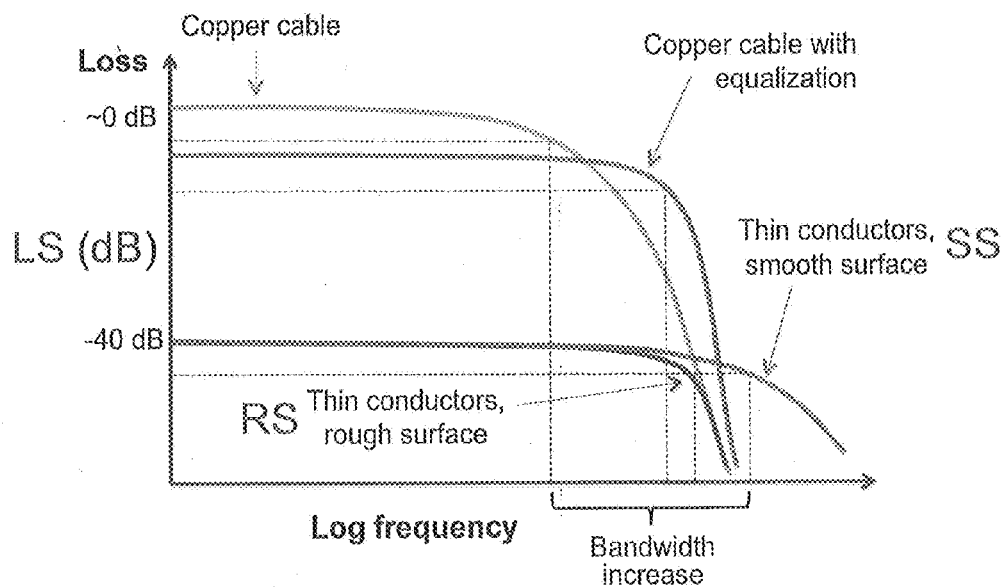

The plot of FIG. 2B is similar to that of FIG. 2A and includes the transmission spectra for the thin-conductor cables 100 of FIGS. 3A and 3B for the case wherein the support member has a rough surface (curve RS) and a smooth surface (curve SS). When metal layer 70 is very thin, an electrical current traveling therein is constrained by the layer dimensions. This results in a constant loss over a large range of frequencies. At very high frequencies, where the skin depth $\delta$ is smaller than the layer thickness t of the conductor layer 70, the loss increases beyond the constant value it has at lower frequencies.

Note that the bandwidth becomes even greater if roughness loss is eliminated, as can be seen by the smooth conductor curve SS of FIG. 2B. The term "self-equalization" is used herein to describe the phenomenon where the transmission medium itself provides a generally flat transmission spectrum without the use of traditional equalization based on electronic signal processing. The term "active equalization" is used herein to describe the need for external components in a transmission system to process the electrical signals to accomplish the equalization.

Conductor Assembly with Metal Layer

FIGS. 4A through 4F illustrate example embodiments of conductor assembly 50. Conductor assembly 50 includes the aforementioned cylindrical support member 60, which has a body 61 that supports at least one metal layer 70. In an example, support member 60 includes at least a smooth outer surface 62. The support member 60 can support the at least one metal layer 70 on outer surface 62. In the example shown in FIGS. 4C, 4D and 4E, the metal layer 70 is formed within body 61. The support member 60 can also support multiple metal layers 70, and in the examples of FIGS. 4D and 4E, support member 60 supports two metal layers 70. For example, the support member 60 of FIG. 4F is in the form of a tube having an inner surface 64 that supports an (inner) metal layer 70, thereby defining a coaxial conductor assembly 50.

Additional example configurations for conductor assembly 50 can include: a) a thin tubular conductor layer 70 on the surface 62 of a cylindrical support member made of one or more of: a dielectric, a high-resistivity metal and a high-permeability metal; b) one or more thin tubular conductor layer 70 inside a body 61 of support member 60 made of one or more of: a dielectric, a high-resistivity metal and a high-permeability metal; and c) thin tubular conductor layers 70 on the inner and outer surfaces of a support member 60 in the form of a tube made of one or more of: a dielectric, a high-resistivity metal and a high-permeability metal.

The cylindrical support member 60 can be made of a dielectric, a high resistivity metal or a high-magnetic-permeability material (e.g., a relative permeability $\mu_T>100$). In an example, support member 60 may be made of glass, and further in an example may be in the form of an optical fiber without the outer polymer coating, as discussed in greater detail below. In an example, the dielectric material for support member 60 is a polymer.

Example high-resistivity materials for support member 60 can include copper-manganese, copper-nickel and nickel-chromium alloys. Example high-magnetic-permeability metals for use in forming support member 60 include mu-metals or nickel-iron alloys.

In an example, metal layer 70 includes at least one thin layer of a non-magnetic conductor with very good electrical conductivity, such as silver, copper, gold, aluminum, zinc, tin or platinum. The metal layer 70 has a thickness t selected so that it is thinner than the skin depth $\delta_m$ of the metal layer at the frequency corresponding to half the data rate the conductor assembly 50 is designed to transmit. Thus, in an example, for a conductor assembly 50 designed to transmit data at a rate of $f_r$ bits per second (bits/s), the thickness t of metal layer 70 should have a maximum value $t_{max}=[(2\rho)/(\pi\mu f_r)]^{1/2}$, where $\rho$ is the resistivity of the conductor and $\mu$ is its magnetic permeability. In an example, the thickness t can be between 0.1 and 10 microns.

For example, if the metal used for metal layer 70 is copper ($\rho=1.7\times10^{-8}$ ohm-m, $\mu=4\pi\times10^{-7}$ H/m), then the thickness $t\leq0.66$ μm can be used to transmit at a data rate of 20 Gb/s, and the thickness $t\leq0.41$ μm can be used to transmit at a data rate of 50 Gb/s.

In an example, metal layer 70 is smooth (i.e., have smooth inner and outer surfaces) to minimize roughness loss at high frequencies. The RMS surface roughness $SR_{RMS}$ of both the inner and outer surfaces of metal layer 70 should be significantly smaller than the layer thickness t, e.g., $SR_{RMS}<t/2$ or more such as $SR_{RMS}<t/5$, and may even be $SR_{RMS}<t/10$. In an example, the data rate $f_r$ of the electrical signals traveling in metal layer 70 defines the skin depth $\delta_m$ in the at least one metal layer, and the outer surface of the metal layer has an RMS roughness $SR_{RMS}<\delta_m$ or even $SR_{RMS}<(0.5)\cdot\delta_m$.

In an example, support member 60 can be made from a combination of a dielectric material, a high-resistivity material and a high-magnetic-permeability material. In the case of the high-resistivity material, the resistivity should be substantially larger than that of the thin conductive layer 70 over the frequency range of interest, e.g., at least 5 times larger and more and may be 10 times larger.

Consider an example conductor assembly 50 wherein support member 60 is in the form of a high-resistance cylindrical wire with a diameter d=0.1 mm and metal layer 70 is made of copper with a thickness t=0.66 μm. The resistance per unit length of the metal layer 70 is given by: $R'_{70}=\rho_{70}/\pi dt=82$ Ω/m.

Suppose now for simplicity that the frequency range of interest extends all the way down to DC. Then the resistance per unit length of the wire support member 60 is given by $R'_{60}=\rho_{60}/\pi(d/2)^2$. To satisfy the condition $R'_{60}>>R'_{70}$, the resistivity $\rho$ of the wire metal must be $\rho_{60}=(d/4t)(\rho_{70})=6.4\times10^{-7}$ Ω-m.

Certain alloys based on Al, Cr, Cu and Ni, such as the Stablohm 800 alloy, available from California Fine Wire of Grover Beach, Calif., have a resistivity of the order of $1\times10^{-5}$ Ω-m and so would be suitable materials for support member 60.

The criterion for wires based on high-permeability metals is the same: the magnetic permeability $\mu$ should be such that the resistance R of the wire (due to the skin effect) is much larger than that of the thin conductive layer over the frequency range of interest.

The cylindrical support member 60 can have any one of a number of different cross-sectional shapes, including circular, oval, polygonal, star-shaped, etc. In an example illustrated in FIG. 4F, the cylindrical support member 60 is in the form of a tube having an inner surface 64 that serves as a second surface that supports a second (inner) metal layer 70.

Figure 5A:
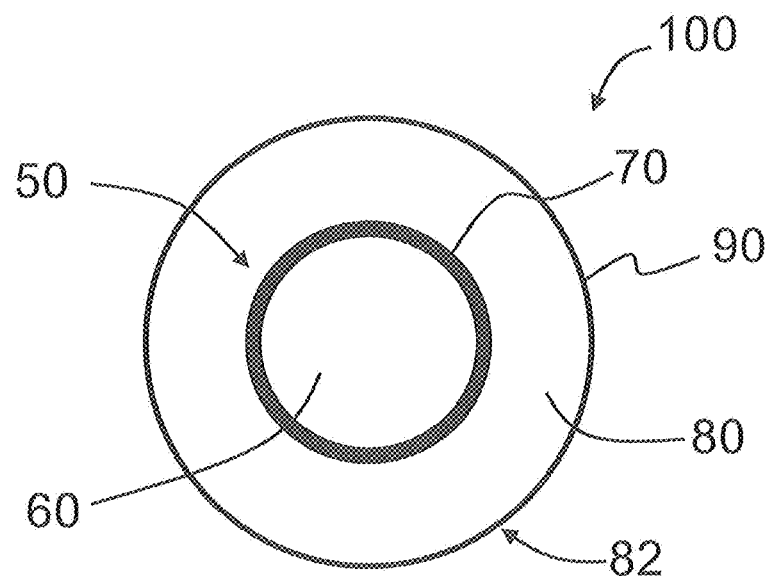
FIGS. 5A-5C are cross-sectional views of more example electrical interconnect cables that employ the example conductor assembly of FIG. 4A.
Figure 5B:
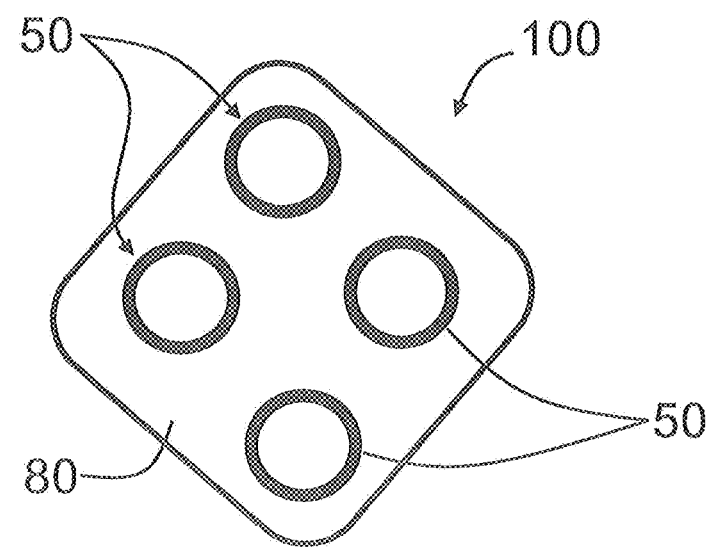
Figure 5:
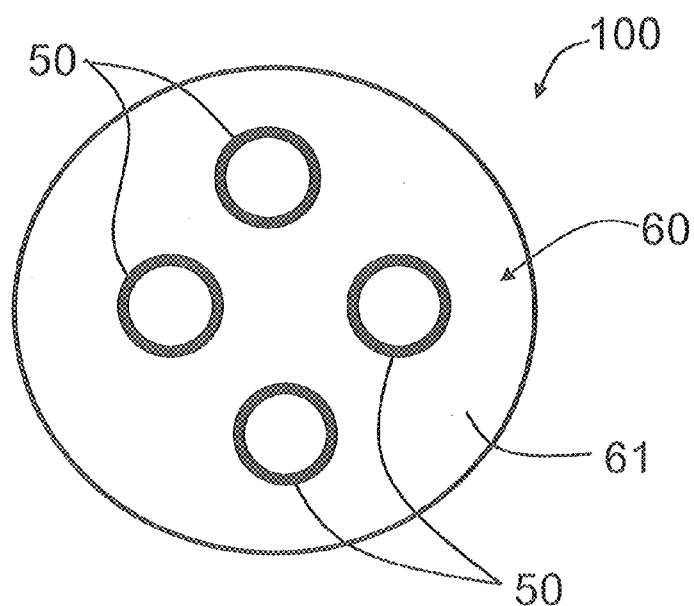

The conductor assembly 50 can be used to fabricate various types of electrical interconnect cables 100, examples of which are shown in the cross-sectional views of FIGS. 5A, 5B and 5C. FIG. 5A is similar to FIG. 4A and illustrates another example coaxial electrical interconnect cable 100, wherein a polymer layer 80 with an outer surface 82 surrounds conductor assembly 50, and a conducting layer 90 resides on the outer surface of the polymer layer. FIG. 5B illustrates an example "quadrax" cable 100 that includes four spaced apart conductor assemblies 50 of the type shown in FIG. 4A.

Compared with traditional copper wires, the use of one or more conductor assemblies 50 that employ at least one metal layer 70 as disclosed herein substantially reduces or eliminates frequency-dependent loss, resulting in substantially constant loss over a broad bandwidth. Used with a broadband amplifier, the conductor assemblies 50 disclosed herein and the electrical interconnect cables that employ the conductor assemblies can achieve higher bandwidth and/or longer reach than conventional copper cables used with active equalization. Additionally, the at least one metal layer 70, by using much less metal than solid wires, can also reduce cable costs.

A glass support member 60 having one or more smooth support surfaces (e.g., outer surface 62) provides metal layer 70 with a smooth inner surface, which reduces the loss caused by surface roughness and as a consequence increases the bandwidth and/or reach of electrical interconnect cable 100, as indicated by the curve SS in FIG. 2B. Compared to other dielectrics like polymers, glass offers better resistance to stretching, which could damage (e.g., tear) the metal layer 70.

A high-resistivity or high-permeability metal support member 60 allows using electroplating to form metal layer 70, resulting in very good adhesion and a mechanically strong wire. The conductor assembly 50 has the desirable self-equalizing interconnect property discussed above.

In one example method of fabricating conductor assembly 50, metal layer 70 is formed using metal (e.g., tin) deposited on a glass optical fiber during the drawing process and then coated with a low-loss polymer material, followed by the usual fiber fabrication process. In another example, metal layer 70 is formed using silver precipitated inside a glass fiber, formed by reducing a silver-ion-exchanged glass fiber in a hydrogen atmosphere. In another example, tubular metal layers 70 made of copper are formed inside a glass fiber by drawing a fiber preform containing copper cylinders. In another example, metal layer 70 is formed as a copper layer electroplated onto a wire support member 60 made of a resistive alloy, such as nichrome, followed by a polymer coating such as PTFE (Teflon).

In embodiments where an optical fiber serves as support member 60, it can be used to transmit optical signals while the at least one conducting layer 70 is used to transmit electrical signals, as discussed below.

Figure 6:
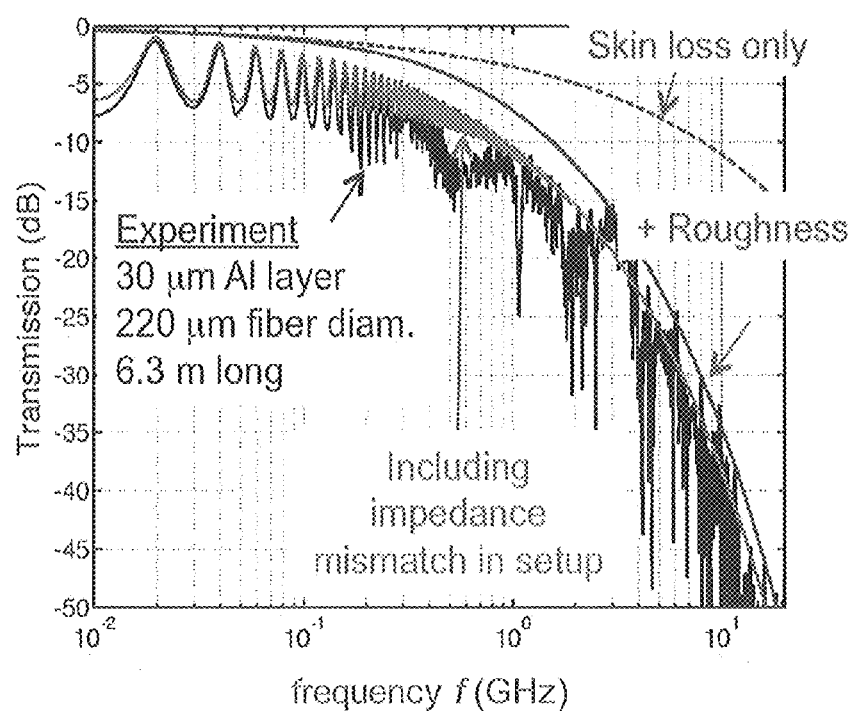
FIG. 6 is a plot of signal transmission (dB) versus the frequency f (GHz) (log scale) showing the transmission spectra for an example electrical interconnect cable that employs an example conductor assembly as disclosed herein.

Experiments were performed on an example twinax electrical interconnect cable 100 made from two conductor assemblies 50 each formed from a support member 60 in the form of a glass core of 220 μm diameter coated with a metal layer 70 of aluminum with a thickness t=30 μm. The example electrical interconnect cable was 6.3 m long. The measured transmission spectrum is shown in FIG. 6. The black curve shows the experimental data; the dashed blue curve shows the impact of skin loss only, while the solid blue line shows the combined result of skin and roughness loss. The red curve shows the calculated transmission spectrum including skin and roughness loss and also the impact of reflections caused by an impedance mismatch between the transmission line and the measurement equipment at both ends of the transmission line. Very good agreement between experiment and theory was achieved.

Conductor Assembly for Data and Power Transmission

One limitation of the example conductor assemblies 50 described above is that they cannot effectively be used to transmit DC power and low-speed auxiliary signals because the loss for these types of signals is too large. Consequently, data transfer protocols such as USB, HDMI and Thunderbolt would require separate wires to transmit DC power and low-speed auxiliary signals as well as data signals.

Figure 7:
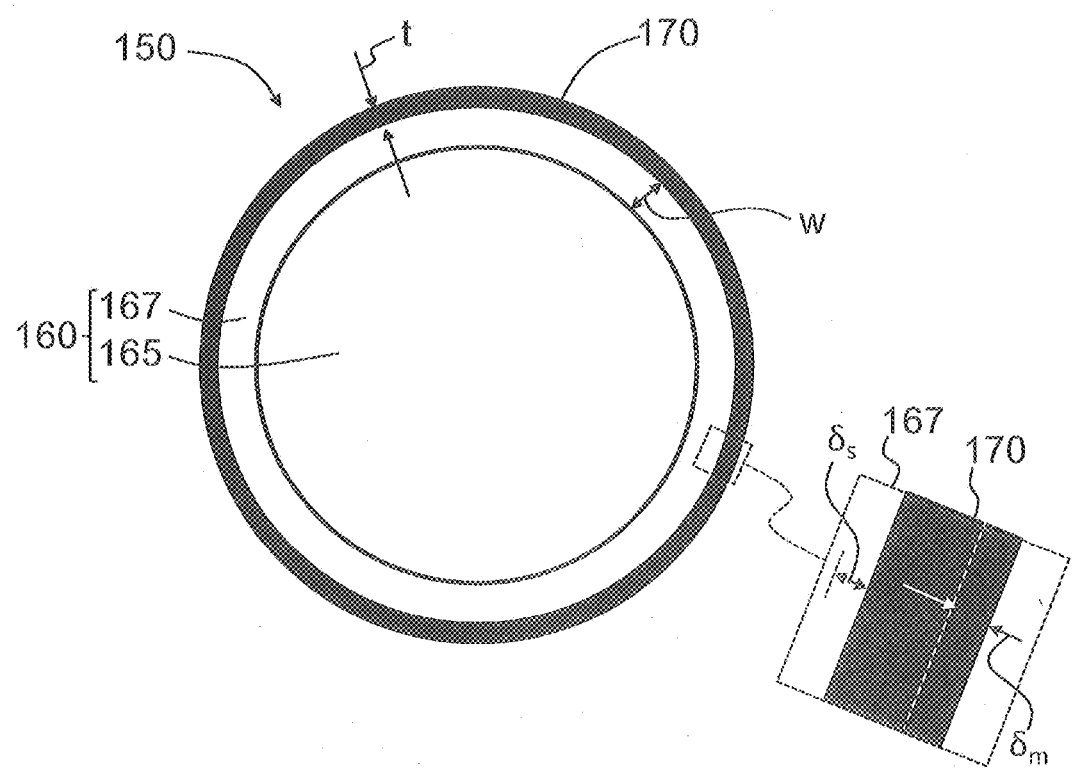
FIG. 7 is a cross-sectional view of an example conductor assembly configured to transmit DC power, low-frequency auxiliary signals and high-frequency data signals.

FIG. 7 is a cross-sectional view of an example conductor assembly 150 configured to transmit DC power and low-speed auxiliary signals. The conductor assembly 150 of FIG. 7 includes a support member 160 having a core conductor 165 surrounded by a shield lay 167 having a high relative magnetic permeability $\mu_T$ of greater than 100, and a thickness w. An example material for shield layer 167 is nickel or steel.

The conductor assembly 150 also includes a metal layer 170 of thickness t formed on shield layer 167. The metal layer 170 can be made of the same materials as metal layer 70 described above. As with conductor assembly 50, the conductor assembly 150 can have a variety of cross-sectional shapes and configurations. In an example, the thickness t of metal layer 170 can be in the range from 0.1 to 10 microns, and the thickness w of shield layer 167 can be in the range from t to 10t.

The high magnetic permeability of shield layer 167 acts as a magnetic shield at high frequencies and prevents the high-frequency content of the electrical data signals traveling in metal layer 170 from reaching core conductor 165. This is due to the fact that the skin depth $\delta_m$ in the metal layer 170 is small when the magnetic permeability $\mu$ is large, so that electromagnetic field B associated with the high-frequency signals decays quickly, with only a small amplitude reaching the core conductor 165. As a result, the electrical data signal traveling in metal layer 170 at high frequencies behaves essentially as if the core conductor 165 was made of an insulating dielectric material. The transmission spectrum has constant but flat loss at high frequency, and low loss at low frequency, allowing for simultaneous high-frequency and low-frequency or DC power transmission over the metal layer 170 and core conductor 165, respectively, of the same conductor assembly 150.

Figures 8A, 8B:
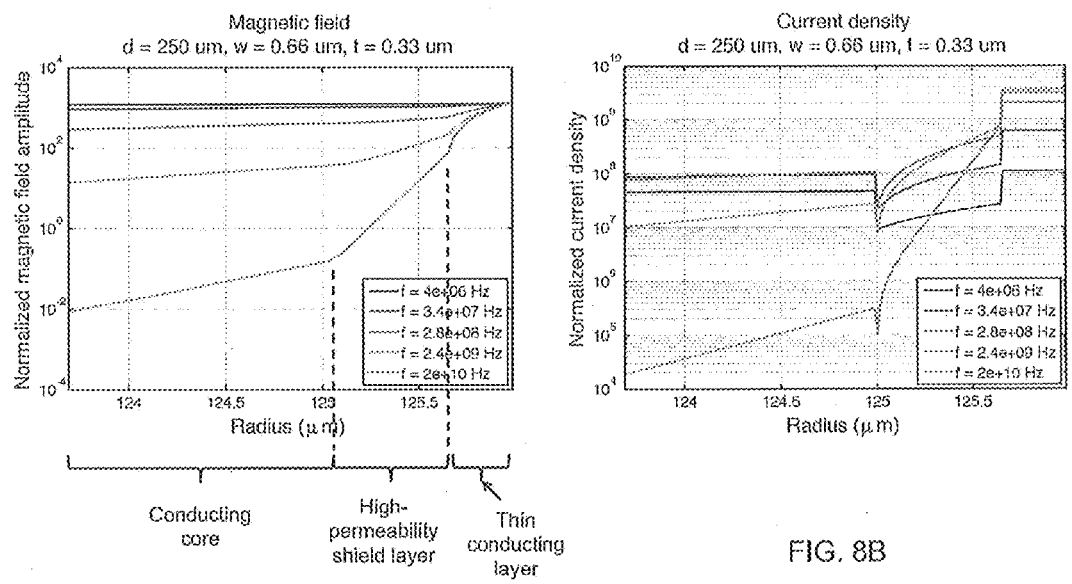
FIGS. 8A through 8D are plots of modeling results on an example conductor assembly 150 that illustrate the above-described shielding effect, with FIG. 8A plotting the normalized magnetic field B versus radius r (µm) of the conductor assembly, FIG. 8B plotting the normalized current density j versus radius r (µm), and FIGS. 8C and 8D plotting the resistance per unit length R' (Ohm/m) versus frequency f (Hz)
Figure 8C:
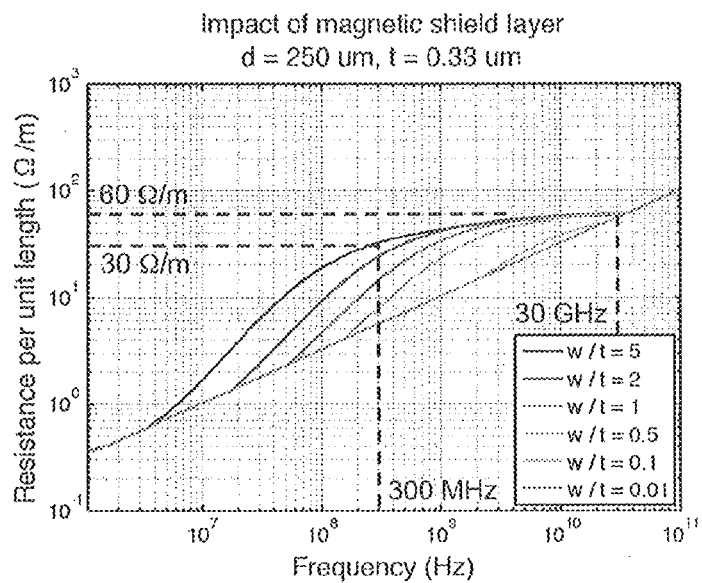
Figure 8D:
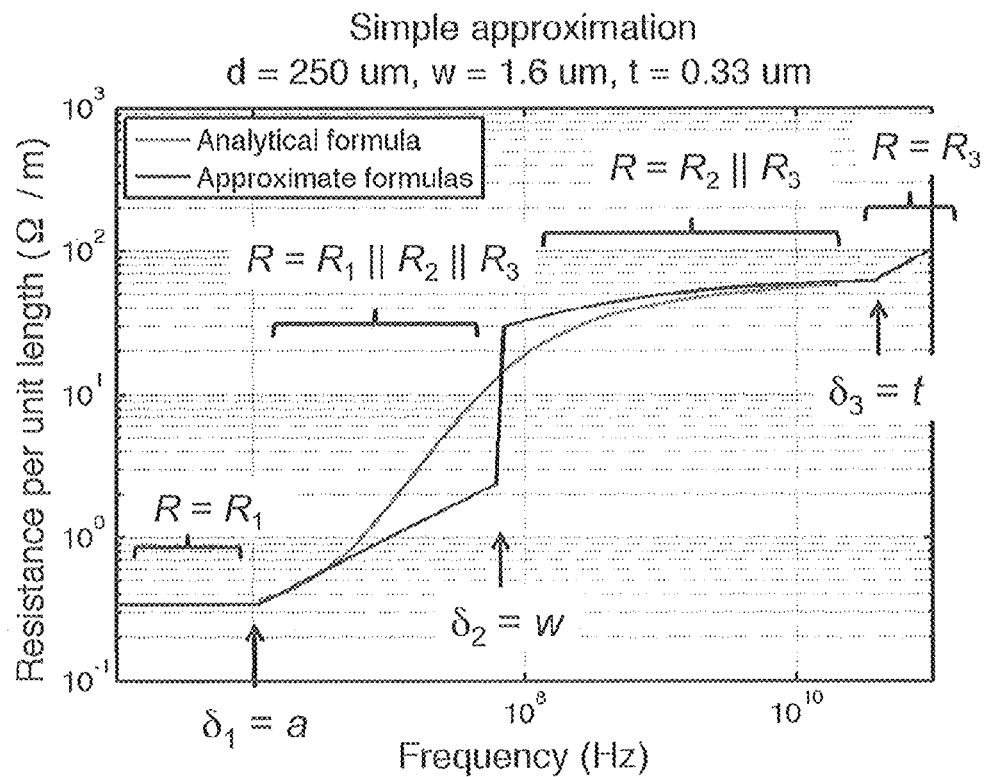

FIGS. 8A through 8D are plots of modeling results on an example core assembly 150 that illustrate the above-described shielding effect. FIG. 8A is a plot of the normalized magnetic field amplitude B versus the radius r (μm) of core assembly 150. FIG. 8B is a plot of the normalized current density versus the radius r (μm) of core assembly 50. FIGS. 8C and 8D are plots of the resistance per unit length (ohms/m) versus the signal frequency f (Hz). The example core assembly 150 for FIGS. 8A and 8B has a core conductor 165 formed by a copper wire having a diameter of 250 μm, a shield layer 167 of nickel having a thickness of w=0.66 μm, and a metal layer 17 made of copper and having a thickness t=0.33 μm. The resistivity of nickel is around 4 times that of copper and its relative permeability $\mu_T$ is assumed here to be 100, but can lie in the 100-600 range in general. The multiple curves in the plots correspond to different frequencies, as indicated in the legends.

With reference to FIG. 8A, at low frequencies (black, blue and red curves), the skin depth $\delta_m$ of metal layer 170 is large and the magnetic field B extends essentially uniformly from the metal layer 170 through core conductor 165. With reference to FIG. 8B, the current density is smaller in shield layer 167 because nickel is more resistive than copper, though the current extends through core conductor 165. Because core conductor 165 is large compared to shield layer 167 and metal layer 170, most of the current travels through the core conductor.

With reference to FIGS. 8A and 8B, at very high frequencies, for example 20 GHz (light blue curve), the skin depth $\delta_s$ in the shielding layer 167 is much smaller than the thickness w of this layer. The magnetic field B and the current density decay very quickly across the shielding layer 167, corresponding as expected to exponential decay (which is linear in a logarithmic scale). In the core conductor 165, the magnetic field B and the current density continue to decrease, but at a slower rate. The fast decay rate in the shield layer 167 is due to the large magnetic permeability of nickel. As a consequence, the current traveling in the core conductor 165 is relatively weak and most of the current travels in metal layer 170 as if the core conductor were made of an insulating material.

The resistance as a function of frequency is shown in FIG. 8C for a variety of shield thicknesses w. When the shield layer 167 is essentially absent (w/t=0.01, pink curve), the resistance R is frequency-dependent over the entire range. However, as the shield layer thickness w increases, a range of constant resistance develops at high frequency. Consider for example the case with a shield thickness w=1.66 μm, or w/t=5, corresponding to the black curve. The resistance per unit length R' remains between 30 and 60 Ohm/m over the frequency range from 300 MHz to 30 GHz. A factor of 2 increase in the resistance corresponds to 6 dB of loss and is the limit beyond which it becomes impossible to recover the signal because eye diagram would start to close.

Consequently, high-speed traffic can be transmitted error-free as long as the frequency content of the electrical signal is in the 300 MHz to 30 GHz range. As an example, a $2^{31}-1$ bit pseudo-random bit sequence ("PRBS31") at 40 Gb/s would fall well within this range. The shield thickness w could be increased further to broaden the flat portion of the transmission spectrum. At low frequencies, the resistance decreases quickly to reach very low values. This allows simultaneous transmission of high-speed data and low-frequency data and/or DC power in conductor assembly 150.

The plot of FIG. 8D provides an intuitive way to understand the above effects. The core conductor 165, the shield layer 167 and the metal layer 170 have respective resistances $R_1$, $R_2$ and $R_3$. When the skin depth $\delta$ is much larger than the dimensions of the given layer, the resistance R is given by R=ρL/A as described above. When the skin depth $\delta$ is much smaller than the layer thickness, the resistance is given by R=ρL/2πaδ. At very low frequencies, where the skin depth $\delta$ is much greater than the diameter d=2·a of core conductor 165, the contributions from the outer layers (i.e., shield layer 167 and metal layer 170) can be neglected and the resistance of the core conductor is simply the DC resistance of the core $R_1$.

At intermediate frequencies where the skin depth $\delta_c$ in the core conductor 165 is much smaller than its radius a but the skin depth $\delta_s$ in the shield layer 167 is much greater than the layer thickness w, the shield layer 167 and the metal layer 170 start to contribute to the total resistance, which is the resistance of all three layers in parallel (noted |$\overline{R_1}$||$\overline{R_2}$||$\overline{R_3}$ in FIG. 8D).

At high frequencies in the frequency range where the skin depth $\delta_w$ in the shield layer 165 is much smaller than the layer thickness w but the skin depth $\delta_m$ in the metal layer 165 much larger than its thickness t, essentially no field penetrates to the core conductor 165 so that the core conductor can be ignored, so that the total resistance is that of |$\overline{R_2}$ and |$\overline{R_3}$ in parallel.

Finally, at very high frequencies where the skin depth $\delta_m$ in the metal layer 170 is much smaller than its layer thickness t, then all the current travels near the surface of the metal layer, and the total resistance is given by |$\overline{R_3}$ only.

Figure 9A:
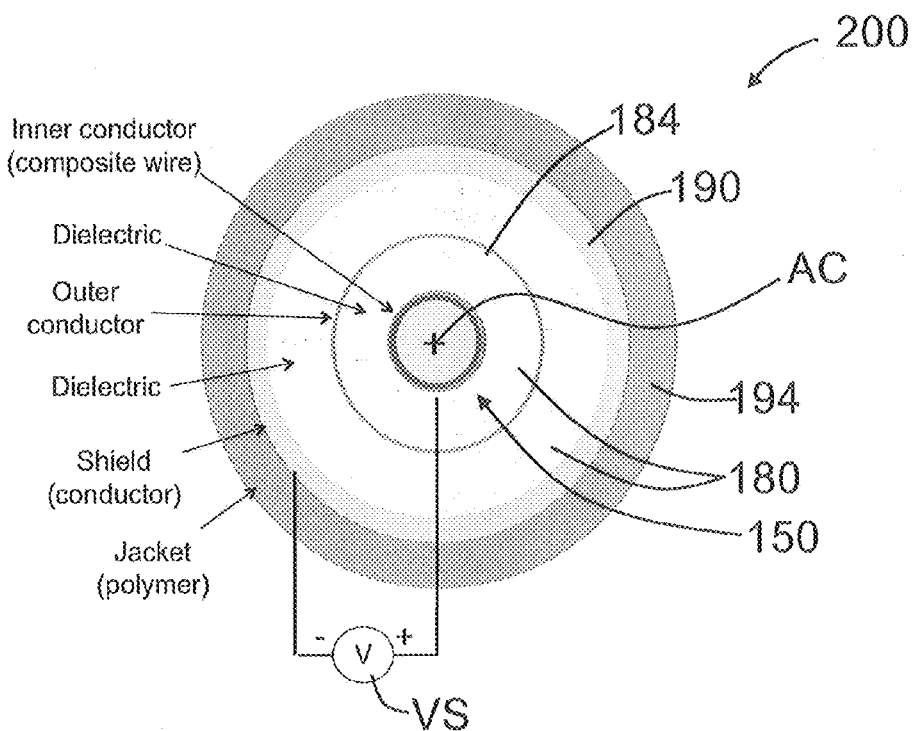
FIGS. 9A and 9B are cross-sectional views of two example electrical interconnect cables that utilize the example conductor assembly of FIG. 7.
Figure 9B:
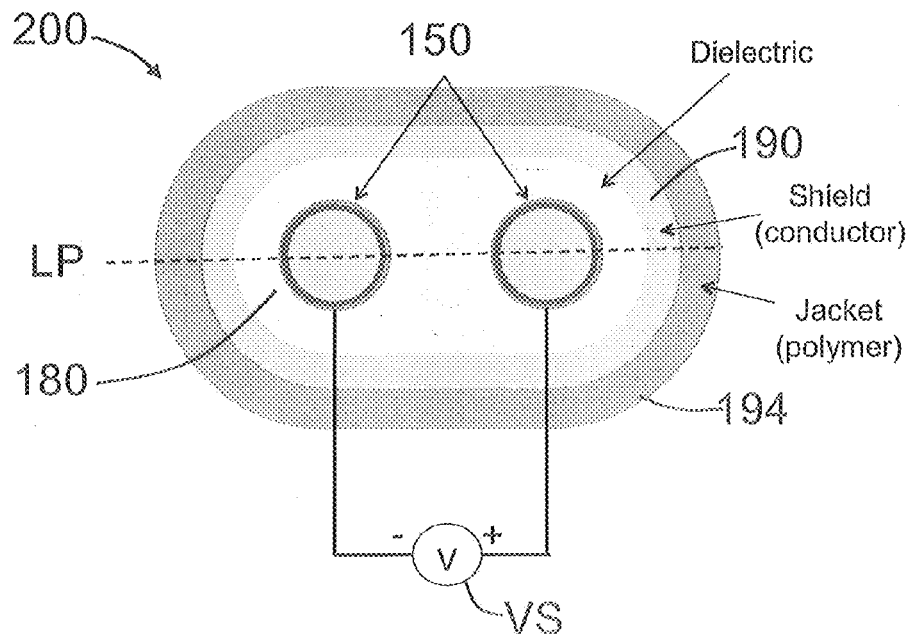

FIGS. 9A and 8B are cross-sectional views of example electrical interconnect cables 200 that utilize one or more of the conductor assemblies 150 disclosed herein. FIG. 9A shows a coax configuration while FIG. 9B shows a triax configuration. The electrical interconnect cable of FIG. 9A includes the conductor assembly 150 of FIG. 7 located along a cable central axis AC. The conductor assembly 150 is surrounded by dielectric layer 180, which in turn is surrounded by an outer conductor 184, which in turn is surrounded by another dielectric layer 180. The outer dielectric layer 180 is in turn surrounded by an electromagnetic (EM) shield layer 190, which in turn is surrounded by a jacket 194. The EM shield layer 190 is made of a conductor and in an example jacket 194 is made of a polymer of the type used in conventional electrical cables. A voltage source VS is shown that illustrates an example electrical power circuit associated with the transmission of power, which requires a return path. The electrical power circuit includes conductive core 165 and either outer conductor 184 or EM shield layer 190. The metal layer 170 is used for high-speed data signals.

FIG. 9B shows an example of a coax electrical interconnect cable 200 wherein two conductor assemblies 150 are spaced apart along a line LP perpendicular to the cable axis AC. A dielectric material 180 surrounds the two conductor assemblies 150, and an EM shield layer 190 surrounds the dielectric material. A jacket 194 surrounds the EM shield layer 190. In this coax embodiment, the two conductor assemblies 150 can be used to define the electrical power circuit, with one of the conductor assemblies used to transmit power while the other used for the return path. Alternatively, EM shield layer 190 can be used for the return path. In an example, one conductor assembly 150 can be used to provide DC power and the other used to transmit low-frequency signals, with EM shield 194 providing the return path to ground. In yet another example, DC power and low-frequency signals can be multiplexed and transmitted over core conductor 165. Other configurations for electrical interconnect cable 200 can be employed, and the two configurations shown in FIGS. 9A and 9B are presented by way of non-limiting examples.

The electrical interconnect cables 200 disclosed herein provide substantially constant loss for data signals over a relatively wide frequency range using at least one metal layer 170 while also providing DC and low-frequency signals using core conductor 165, thereby obviating the need for separate wires for different signal types. The ability of the electrical interconnect cables 200 disclosed herein to transmit DC signals, low-frequency signals and high-frequency signals allows for thinner cables and reduced cabling costs.

The electrical interconnect cables 200 can find use for data transfer protocols such as USB, HDMI or Thunderbolt, which require simultaneous transmission of electrical power, low-frequency link-management signals and high-speed data. Compared with traditional copper-wires interconnect cables, the electrical interconnect cables 200 described can increase the bandwidth and/or the reach without the need for separate wires to carry power and/or low-frequency signals.

Metalized Optical Fiber

In example embodiment of conductor assemblies disclosed herein, the support member can include an optical fiber, with the metal layer disposed on the outer surface of the optical fiber. Such a conductor assembly is referred to hereinafter as a "metalized fiber" 250.

Figure 10:
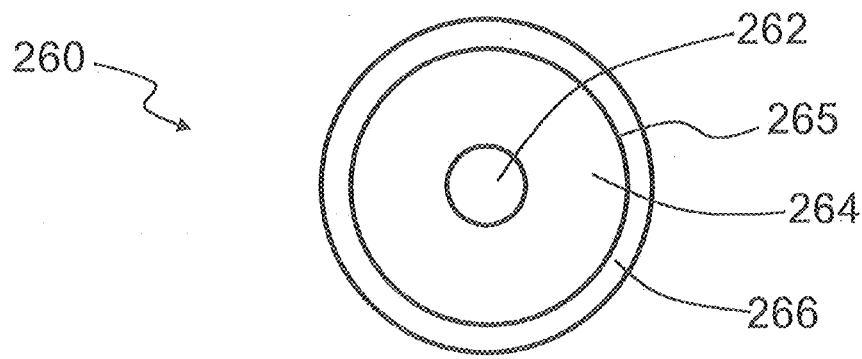
FIG. 10 is a cross-sectional view of a conventional optical fiber, showing the glass core and glass cladding surrounded by a high-loss polymer layer.

FIG. 10 is a cross-sectional view of an example of a typical optical fiber 260. The optical fiber includes a central glass core region ("core") 262 surrounded by a glass cladding region ("cladding") 264 of lower refractive index than the core. The cladding 264 includes an outer surface 265. A protective coating 266 surrounds the cladding outer surface 265 and is typically made of a polymer. The role of protective coating 266 is to increase the bend resistance of optical fiber 260.

The protective layer 266 is typically made of the polymer urethane acrylate, which has a relatively high dielectric loss. Dielectric loss is frequency dependent and thus can cause distortion of a high-frequency electrical signal, which ultimately limits the reach and data rate for data signals. For this reason, high-speed electrical cables typically use low-loss dielectric materials, such as polyethylene and Teflon, to fill the space surrounding the copper wires.

Figure 11A:
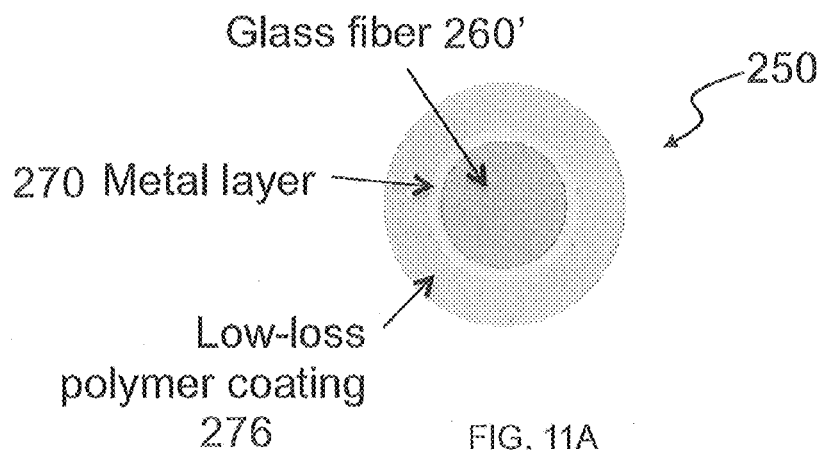
FIGS. 11A and 11B are cross-sectional views of two example conductor assemblies, referred to as a "metalized fibers" that are configured to transmit electrical signals in the metal layer and to transmit optical signals in the optical fiber.

FIG. 11A is a cross-sectional view of an example configuration for metalized fiber 250. The metalized fiber 250 includes glass fiber 260', which is the same as glass fiber 260 but without protective coating 266. A metal layer 270 is formed on the outer surface 265 of cladding 264. A low-loss polymer coating layer 276 surrounds metal layer 270.

Figure 11B:
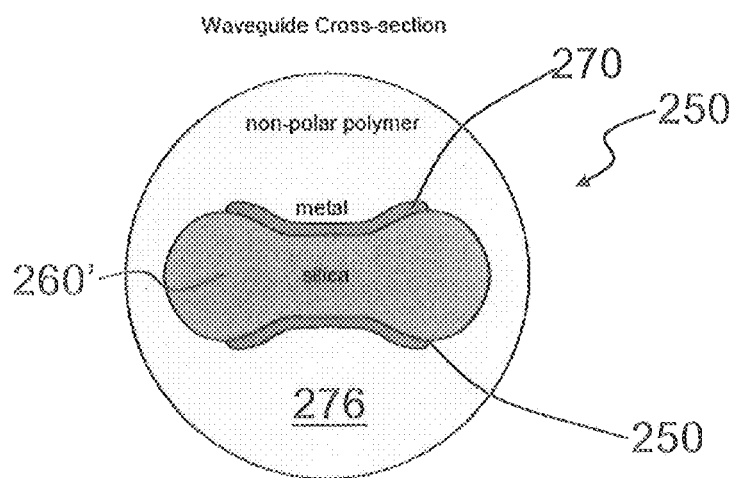

FIG. 11B is a cross-sectional view of another example configuration for metalized fiber 250, wherein the glass fiber 260' has a dog-bone shape that supports two spaced apart (i.e., unconnected) metal layers 270 on opposite long sides of the glass fiber. The low-loss polymer layer 276 surrounds glass fiber 260' and the two metal layers 270.

Figure 11C:
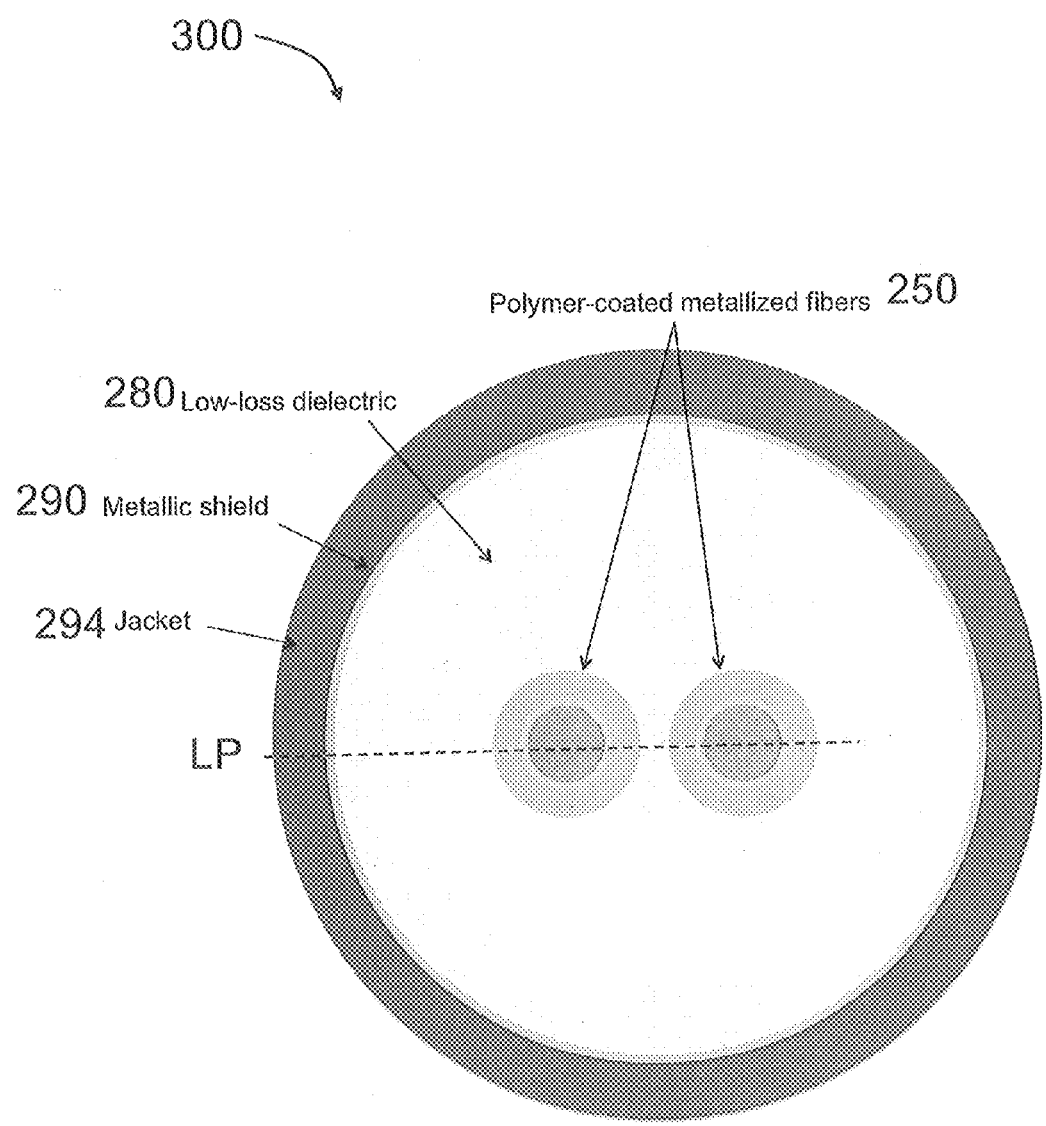
FIG. 11C is a cross-sectional view of an example twin-axial interconnect cable that utilizes two of the example metalized fibers shown in FIG. 11A.

FIG. 11C is a cross-sectional view of an example hybrid electrical-optical interconnect cable 300 that utilizes two of the metalized fibers 250 shown in FIG. 11A to define a twinax cable configuration. The two metalized fibers 50 lie along the line LP and are surrounded by a low-loss dielectric material 280. A conductive EM shield layer 290 surrounds the dielectric material. A protective jacket 294 surrounds the EM shield layer.

The thickness of the low-loss polymer coating 276 is not critical. At a minimum, it may provide a reasonable amount of bend resistance. The polymer coating 266 may also be configured to allow the metalized fibers 250 to be at a distance from one another to achieve the desired line impedance. For example, if the dielectric constant of the surrounding dielectric layer 280 is 2, then the separation of the two metalized fibers 250 required to achieve a differential impedance of 100 ohms is about 1.78 times the glass fiber diameter. In particular, if the diameter of the glass fiber is 125 μm, then the desired separation should be 223 μm; consequently the thickness of polymer coating 276 should be at most (223−125)/2=49 μm. Increasing the dielectric constant of the surrounding layer 280 allows for increasing the separation of the two metalized fibers 250 and increasing the maximum coating thickness.

Low-loss dielectric materials suitable for use in polymer layer 276 include: Teflon, polyethylene, polystyrene and polypropylene. The loss tangent of these materials in the GHz range is in the range between 0.0001 and 0.0004. Air-filled materials or foams are also good candidates because air has very low loss.

Data Link System

Figure 12A:
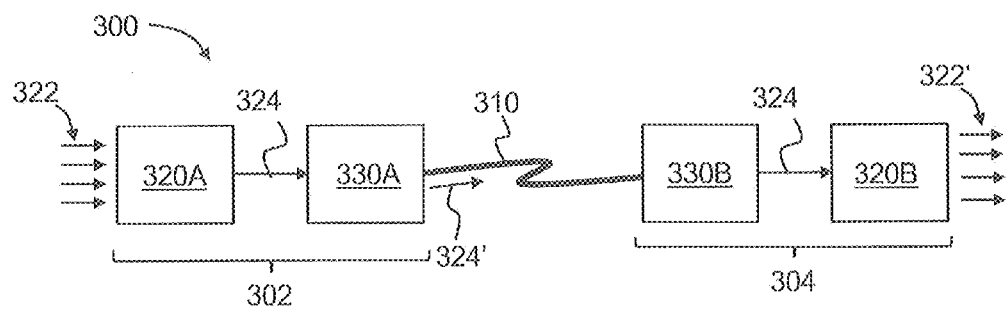
FIG. 12A is a schematic diagram of a prior art data link system that includes a prior art electrical interconnect cable used in combination with active equalization.

FIG. 12A is a schematic diagram of a prior art data link system 300 that includes a conventional electrical interconnect cable 310. The data link system 300 includes a transmit side 302 and a receive side 304. The transmit side 302 end includes a serializer 320A that receives data 322 as a parallel N-bit wide stream and forms a serialized data signal 324. The data signal 324 then proceeds to a transmit-side equalizer 330A, such as a Finite Impulse Response (FIR) equalizer, that pre-distorts the higher frequencies of the binary data signal 324 to form an equalized data signal 324'. The equalized data signal 324' is then carried by electrical interconnect cable 310 to receive side 304, which includes a receive-side equalizer 330B. The receive-side equalizer receives the transmitted equalized signal 324' and performs additional equalization, such as continuous time linear equalization (CTLE) and decision-feedback equalization (DFE) to recover the original data signal 324. The resulting recovered data signal 324 is then sent to a de-serializer 320B to output the corresponding parallel N-bit data stream 322'.

Figure 12B:
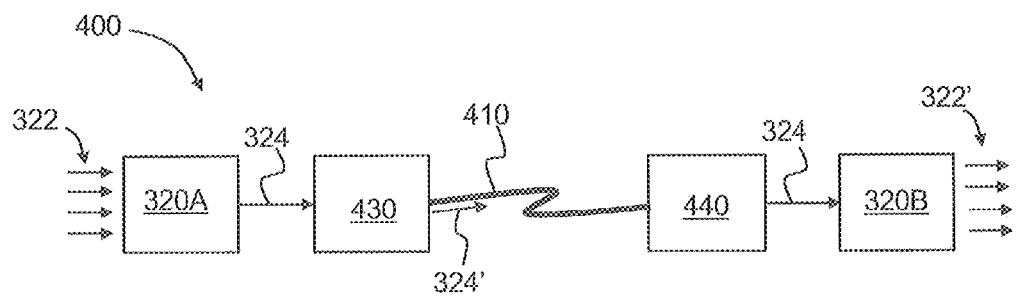
FIG. 12B is a schematic diagram of a prior art data link system that includes the self-equalizing electrical interconnect cable as disclosed herein.

FIG. 12B is a schematic diagram of a data link system 400 that includes one of the different embodiments of the electrical interconnect cables disclosed herein, including the hybrid electrical-optical interconnect cable discussed above. The data link system 400 includes serializer 320A and de-serializer 320B but does not require a transmit-side equalizer or a receive-side equalizer because electrical interconnect cable 410 has the self-equalizing property discussed above. Thus, the transmit-side equalizer 330A of the prior art data link system 300 is replaced by a line driver 430 and the receive-side equalizer 330B is replaced with an amplifier 440 (e.g., a 40 dB amplifier). Thus, the line driver 430 simply inputs the data signal 324 onto the electrical interconnect cable 410, and the amplifier 440 receives the transmitted signal 324' and amplifies it. The de-serializer then de-serializes the data signal 324 to output the corresponding parallel N-bit data stream 322'. Thus, the use of the self-equalizing electrical interconnect cable 410 simplifies the data link system.

In an example where electrical interconnect cable 410 is the hybrid electrical-optical interconnect cable 300 disclosed above, then the data signals 322 include optical signals as well as electrical signals (or the transmit side is configured to generate optical data signals from at least some for the electrical data signals), and the receive side 304 is configured to receive and detect both electrical and optical signals.

Figure 12C:
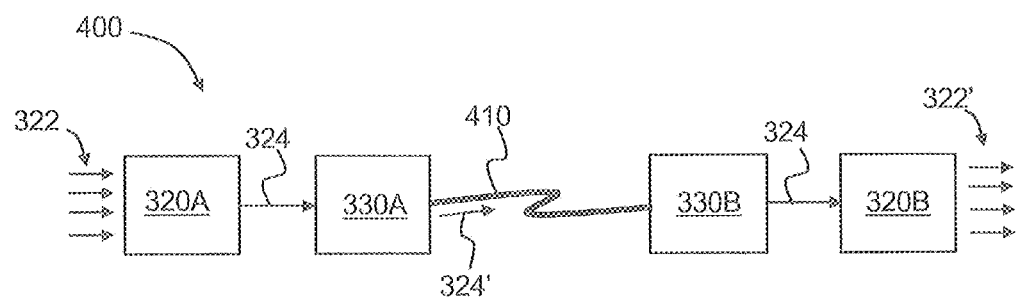
FIG. 12C is a schematic diagram of a data link system that utilizes both active equalization and the self-equalizing electrical interconnect cable as disclosed herein.

FIG. 12C is an example data link system 400 that utilizes the self-equalizing electrical interconnect cable 410 disclosed herein, and at least one of the transmit-side and receive-side equalizers 330A and 330B. The data link system 400 of FIG. 12C represents a balance wherein some self-equalization is performed by the self-equalizing electrical interconnect cable 410 and some equalization is done using at least one of the transmit-side and receive-side equalizers 330A and 330B. Both of the transmit-side and receive-side equalizers 330A and 330B are shown by way of example.

By way of example, consider a twinax electrical interconnect cable 410 that includes two spaced apart conductor assemblies 50 embedded in a low-loss dielectric material 80 such as PTFE. Each conductor assembly includes a support member 60 in the form of insulating wire with a diameter of 0.4 mm coated with a metal layer 70 of 0.5 microns of copper. If the center-to-center spacing between the conductor assemblies 50 is 1 mm in a low-loss dielectric such as PTFE, then a 5 meter long electrical interconnect cable 410 will have an attenuation of about 10 dB at frequencies up to about 10 GHz. The 5 meter length would be adequate for cabling inside of server racks in data centers. Simulations show that it would be possible to transmit 50 Gb/s data using the example electrical interconnect cable 410 without the need for active equalization such as the types described above with respect to FIG. 12A.

It will be apparent to those skilled in the art that various modifications to the embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A conductor assembly for an electrical cable for transmitting electrical signals having a data rate, comprising:
a cylindrical support member made of at least one of: a dielectric material, a metal having a resistivity R greater than $10^{-5}$ ohm-meters and a material having a relative magnetic permeability $\mu_r$>100, the cylindrical support member having a body and an outer surface; and
at least one metal layer supported by the cylindrical support member and having a thickness t and that supports the transmission of the electrical signals, wherein the thickness t is less than a skin depth in the at least one metal layer as defined by half of the data rate of the electrical signals, and the outer surface has a root-mean-square roughness that is less than half of the skin depth.

2. The conductor assembly according to claim 1, wherein the at least one metal layer is formed on the outer surface of the cylindrical support member.

3. The conductor assembly according to claim 1, wherein the at least one metal layer has a tubular shape with a round or oval cross-sectional shape.

4. The conductor assembly according to claim 1, wherein the cylindrical support member has a tubular shape with an inner surface, and wherein the at least one metal layer includes an inner metal layer formed on the inner surface and an outer metal layer formed on the outer surface.

5. The conductor assembly according to claim 1, wherein the cylindrical support member is made of glass.

6. The conductor assembly according to claim 5, wherein the cylindrical support member includes an outer surface, and wherein the at least one metal layer is formed on the outer surface.

7. The conductor assembly according to claim 6, wherein the cylindrical support member is an optical fiber that consists of a glass core surrounded by a glass cladding.

8. The conductor assembly of claim 7, wherein the at least one metal layer consists of first and second spaced apart metal layers formed on first and section sections of the outer surface.

9. The conductor assembly of claim 8, wherein the cylindrical support member has a dog-bone cross-sectional shape.

10. The conductor assembly according to claim 1, wherein the cylindrical support member is made of a polymer.

11. The conductor assembly according to claim 1, wherein the cylindrical support member is made of at least one of: copper-manganese, copper-nickel and a nickel-chromium alloy.

12. The conductor assembly according to claim 1, wherein the at least one metal layer is made of at least one of: silver, copper, gold, aluminum, zinc, tin and platinum.

13. The conductor assembly according to claim 1, wherein the at least one metal layer has a resistivity $R_L$ and wherein $R>10 \cdot R_L$.

14. The conductor assembly according to claim 1, wherein the cylindrical support member has either a circular or an oval cross-sectional shape.

15. The conductor assembly according to claim 1, wherein the at least one metal layer is embedded within the body of the cylindrical support member.

16. The conductor assembly according to claim 15, wherein the at least one metal layer comprises multiple metal layers that define either a coax, a twinax or a quadrax configuration.

17. An electrical interconnect cable, comprising:
at least one conductor assembly according to claim 1.

18. The electrical interconnect cable according to claim 17, including two or more spaced apart conductor assemblies embedded within a dielectric material.

19. The electrical interconnect cable according to claim 17, wherein the electrical interconnect cable has either a coax, a twinax or a quadrax configuration.

20. The electrical interconnect cable according to claim 17, wherein the support member of the at least one conductor comprises an optical fiber that supports transmission of optical signals.

21. The electrical interconnect cable according to claim 17, wherein the dielectric material in which the two or more spaced apart conductor assemblies are embedded comprises a polymer.

22. The electrical interconnect cable according to claim 17, wherein the polymer comprises a non-polar polymer such as polyethylene, polyisobutylene, poly 4-methylpentent (TPX), poly dimethyl phenyloxide (PPO), polypropylene, polystyrene, and polytetrafluoroethylene (PTFE).

23. The electrical interconnect cable according to claim 22, wherein the data rate is in the range from 5 Gb/s to 100 Gb/s.

24. A conductor assembly for simultaneously transmitting electrical data signals and direct-current power, comprising:
a cylindrical core conductor having an outer surface;
a shield layer disposed on the outer surface of the cylindrical core, the shield layer having a relative magnetic permeability $\mu_T > 100$, a thickness w and an outer surface, wherein the shield layer has a skin depth $\delta s$ defined by a frequency of the electrical data signals, and wherein the thickness w is in the range $\delta s \leq w \leq 10 \cdot \delta s$;
a metal layer of thickness t disposed on the outer surface of the shield layer, wherein the thickness t is in the range from 0.1 µm≤t≤10 µm; and
wherein the core conductor supports the transmission of the direct-current power and wherein the metal layer supports the transmission of the electrical data signals.

25. The conductor assembly according to claim 24, wherein the core conductor comprises a copper wire.

26. The conductor assembly according to claim 24, wherein the shield layer comprises either nickel or steel.

27. The conductor assembly according to claim 24, wherein the thickness t of the thin conductor layer is in the range from 0.1 to 10 micrometers.

28. An electrical interconnect cable, comprising:
at least one conductor assembly according to claim 24;
an outer conductor that surrounds the at least one conductor assembly; and
a first layer of dielectric material that resides between the at least one conductor assembly and the outer conductor; and
an outer jacket that surrounds the dielectric layer.

29. The electrical interconnect cable according to claim 28, wherein the at least one conductor assembly comprises a single conductor assembly and wherein the single conductor assembly and the outer conductor define a coaxial cable configuration.

30. The electrical interconnect cable according to claim 28, further including an electromagnetic shield layer surrounding the outer conductor and separated therefrom by a second layer of dielectric material.

31. The electrical interconnect cable according to claim 28, wherein the at least one conductor assembly consists of first and second conductor assemblies in twin axial configuration.

32. The electrical interconnect cable according to claim 28, wherein the at least one conductor assembly consists of four conductor assemblies in quadraxial configuration.

33. A conductor assembly for transmitting electrical and optical data signals, comprising:
an optical fiber that includes a glass core and a glass cladding immediately surrounding the core, wherein the glass cladding has an outer surface and wherein the glass core and glass cladding define an optical waveguide;
at least one metal layer disposed on the outer surface of the glass cladding, the at least one metal layer having an outer surface and supporting the transmission of electrical data signals, wherein the at least one metal layer consists of first and second spaced apart metal layers; and
a dielectric layer disposed on the outer surface of the at least one metal layer, the dielectric layer having a loss tangent of between 0.0001 and 0.001 in a gigahertz frequency range.

34. The conductor assembly according to claim 33, wherein the at least one metal layer has a thickness tin the range from 0.1 to 10 micrometers.

35. The conductor assembly according to claim 33, wherein the at least one metal layer is in the form of a tube.

36. The conductor assembly according to claim 33, wherein the optical fiber has a dog-bone cross-sectional shape.

37. A hybrid electrical-optical interconnect cable, comprising:
at least one conductor assembly according to claim 33;
a layer of dielectric material surrounding the at least one conductor assembly; and
a protective outer jacket surrounding the layer of dielectric material.

38. The hybrid electrical-optical interconnect cable according to claim 37, further including an electromagnetic shield arranged within the protective outer jacket and either on or within the layer of dielectric material.

39. The hybrid electrical-optical interconnect cable according to claim 37, wherein the at least one conductor assembly includes first and second conductor assemblies arranged to define a twin axial configuration.

40. A conductor assembly for transmitting electrical data signals and optical data signals, comprising:
a glass core and a glass cladding immediately surrounding the core, wherein the glass core and cladding define an optical fiber waveguide that supports the transmission of the optical data signals;
a metal layer disposed on an outer surface of the glass cladding, the metal layer formed from a metal having a resistivity R greater than $10^{-5}$ ohm-meters, and the metal layer supporting the transmission of the electrical data signals, wherein the electrical data signals have a frequency of between 25 GHz and 40 GHz, and the metal layer comprises a resistivity $R_L$ and wherein $R > 10 \cdot R_L$; and
a dielectric layer disposed on the outer surface of the metal layer, the dielectric layer having a loss tangent of between 0.0001 and 0.001 in a gigahertz frequency range.

41. The conductor assembly according to claim 40, wherein the dielectric layer comprises a polymer.

42. The conductor assembly according to claim 40, wherein the metal layer has a thickness t in the range from 0.1 to 10 microns.

\* \* \* \* \*

UNITED STATES PATENT AND TRADEMARK OFFICE
CERTIFICATE OF CORRECTION

PATENT NO. : 9,983,376 B2
APPLICATION NO. : 15/131252
DATED : May 29, 2018
INVENTOR(S) : Charbonneau-Lefort et al.

Page 1 of 1

It is certified that error appears in the above-identified patent and that said Letters Patent is hereby corrected as shown below:

In the Claims

In Column 16, Line 28, Claim 34, delete "thickness tin" and insert -- thickness t in --, therefor.

Signed and Sealed this
Eighteenth Day of August, 2020

Andrei Iancu
*Director of the United States Patent and Trademark Office*